United States Patent
He

(10) Patent No.: US 9,612,491 B2
(45) Date of Patent: Apr. 4, 2017

(54) DISPLAY PANEL

(71) Applicant: SHENZHEN CHINA STAR OPTOELECTRONICS TECHNOLOGY CO., LTD., Shenzhen, Guangdong (CN)

(72) Inventor: JhenWei He, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/370,231

(22) PCT Filed: Jan. 17, 2014

(86) PCT No.: PCT/CN2014/070849
§ 371 (c)(1),
(2) Date: Jul. 2, 2014

(87) PCT Pub. No.: WO2015/089930
PCT Pub. Date: Jun. 25, 2015

(65) Prior Publication Data
US 2016/0299369 A1    Oct. 13, 2016

(30) Foreign Application Priority Data
Dec. 20, 2013 (CN) .......................... 2013 1 0714129

(51) Int. Cl.
| G02F 1/136 | (2006.01) |
| G02F 1/1347 | (2006.01) |
| G02F 1/1335 | (2006.01) |
| G02F 1/13363 | (2006.01) |
| G02F 1/1362 | (2006.01) |
| G02F 1/1368 | (2006.01) |

(52) U.S. Cl.
CPC .......... *G02F 1/1347* (2013.01); *G02F 1/1368* (2013.01); *G02F 1/13363* (2013.01);
(Continued)

(58) Field of Classification Search
CPC ............. G02F 1/1347; G02F 1/133514; G02F 1/133528
(Continued)

(56) References Cited

U.S. PATENT DOCUMENTS 5,296,952 A * 3/1994 Takatsu ............... G02F 1/13476
349/77
6,295,109 B1 * 9/2001 Kubo ................ G02F 1/133371
349/117
(Continued)

FOREIGN PATENT DOCUMENTS

| CN | 1247326 A | 3/2000 |
| CN | 201689227 U | 12/2010 |

(Continued)

OTHER PUBLICATIONS

Yuan Xiao, the International Searching Authority written comments, Sep. 2014, CN.

*Primary Examiner* — Lucy Chien

(57) ABSTRACT

The present invention discloses a display panel includes a first liquid crystal panel, a second liquid crystal panel, and a backlight module. The second liquid crystal is stacked on the first liquid crystal panel. The backlight module is set below the first liquid crystal panel and the second liquid crystal panel. The first liquid crystal panel and the second liquid crystal panel are similar as shape and size and both have a same pixel arrangement. Each pixel on the first liquid crystal panel is aligned with a corresponding pixel on the second liquid crystal panel. The first liquid crystal panel is a normal white liquid crystal panel. The second liquid crystal is a normal black liquid crystal panel. A light from the backlight module orderly passes through the first liquid crystal panel and the second liquid crystal panel and is modulated to display an image.

10 Claims, 4 Drawing Sheets

(52) U.S. Cl.
CPC .... *G02F 1/13471* (2013.01); *G02F 1/133514* (2013.01); *G02F 1/133528* (2013.01); *G02F 1/136286* (2013.01); *G02F 2001/133531* (2013.01); *G02F 2201/123* (2013.01); *G02F 2203/64* (2013.01); *G02F 2203/66* (2013.01)

(58) Field of Classification Search
USPC .......................................................... 349/46
See application file for complete search history.

(56) References Cited

U.S. PATENT DOCUMENTS

2002/0171794 A1* 11/2002 Nakamura ........ G02F 1/133555
                                                         349/117
2005/0195342 A1*  9/2005 Grip ................... G02F 1/13471
                                                          349/74
2013/0100124 A1*  4/2013 Kim .................. G02B 27/2214
                                                          345/419

FOREIGN PATENT DOCUMENTS

| | | |
|---|---|---|
| CN | 202177752 U | 3/2012 |
| CN | 102466917 A | 5/2012 |
| CN | 202615053 U | 12/2012 |
| CN | 103033987 A | 4/2013 |
| CN | 103293747 A | 9/2013 |
| CN | 103309097 A | 9/2013 |
| CN | 203299486 U | 11/2013 |
| JP | S63271422 A | 11/1988 |

* cited by examiner

DISPLAY PANEL

FIELD OF THE INVENTION

The invention relates to display panel technologies, and particularly, to a fast respond display panel.

BACKGROUND OF THE INVENTION

Generally, a display panel only layer of liquid crystal molecules. The display panel is distinguished as a normal white display panel and a normal black display panel according to different driving methods. However, a response time of the single layer liquid crystal molecules to a rising edge of a driving single is different to a falling edge of the driving single. The response time of the normal white display panel from an opaque state to a transparent state is greater than the response time of the normal white display panel from the transparent state to the opaque state. The response time of normal black display panel from the transparent state to the opaque state is greater than the response time of the normal black display panel from the opaque state to the transparent state. Thus, no matter whether is the normal white display panel or the normal black display panel, the response time cannot perfectly match with each other.

Therefore, it is desirable to provide a means which can solve the above-mentioned problems.

SUMMARY OF THE INVENTION

To solve the above-mentioned problem, the present invention provides a display panel includes a first liquid crystal panel, a second liquid crystal panel, and a backlight module. The second liquid crystal is stacked on the first liquid crystal panel. The backlight module is set below the first liquid crystal panel and the second liquid crystal panel. The first liquid crystal panel and the second liquid crystal panel are similar as shape and size and both have a same pixel arrangement. Each pixel on the first liquid crystal panel is aligned with a corresponding pixel on the second liquid crystal panel. The first liquid crystal panel is a normal white liquid crystal panel. The second liquid crystal is a normal black liquid crystal panel. A light from the backlight module orderly passes through the first liquid crystal panel and the second liquid crystal panel and is modulated to display an image.

Wherein each of the first liquid crystal panel and the second liquid crystal panel includes a color filter substrate, an upper polarizer, a lower polarizer, a plurality of liquid crystal molecules, and a thin film transistor substrate, and the liquid crystal molecules are set between the color filter and the thin film transistor substrate.

Wherein a polarization direction of the upper polarizer of the first liquid crystal panel is perpendicular to a polarization of the lower polarizer.

Wherein a polarization direction of the upper polarizer of the second liquid crystal panel is parallel to a polarization of the lower polarizer.

Wherein a polarization direction of the upper polarizer of the second liquid crystal panel is perpendicular to a polarization of the lower polarizer.

Wherein the thin film transistor substrate includes a plurality of scan lines extending along a first direction, a plurality of data lines extending from a second direction, a plurality of thin film transistors, and a plurality of pixel electrodes.

Wherein the thin film transistors are correspondingly set at cross points of the scan lines and the data lines in each pixel unit, each of the thin film transistors includes a gate electrode, a source electrode, and a drain electrode, the gate electrode is connected to the scan lines, the source electrode is connected to the data line, the drain electrode is connected to the pixel electrode in the pixel unit.

Wherein further includes an anisotropy phase compensating film set between the first liquid crystal panel and the second liquid crystal panel.

Wherein the anisotropy phase compensating film is selected from a group consisting of a parallel optical axis phase compensating film and a perpendicular optical axis phase compensating film.

Wherein optical axes of the parallel optical axis phase compensating film is parallel to a surface of the film, and optical axis of the perpendicular optical axis phase compensating film is perpendicular to the surface of the film.

The display panel of the embodiment of the present embodiment makes a dual-layers panel structure by stacking the normal white liquid crystal panel and the normal black liquid crystal panel, employs the normal black liquid crystal panel to provide the shorter response time from the black image to the white image, employs the normal white liquid crystal panel to provide the shorter response time from the white image to the black image, and thus shorten the response time of the whole display panel. Meanwhile, the wide viewing angle display performance is improved by adding the anisotropy phase compensating film to restrict the light from the angle deviated a little wide emits out from the pixel unit not exactly facing.

BRIEF DESCRIPTION OF THE DRAWINGS

In order to illustrate technical schemes of the present invention or the prior art more clearly, the following section briefly introduces drawings used to describe the embodiments and prior art. Obviously, the drawing in the following descriptions just is some embodiments of the present invention. The ordinary person in the related art can acquire the other drawings according to these drawings without offering creative effort.

DETAILED DESCRIPTION OF THE PREFERRED EMBODIMENTS

The following sections offer a clear, complete description of the present invention in combination with the embodiments and accompanying drawings. Obviously, the embodiments described herein are only a part of, but not all of the embodiments of the present invention. In view of the embodiments described herein, any other embodiment obtained by the person skilled in the field without offering creative effort is included in a scope claimed by the present invention.

Figure 1:
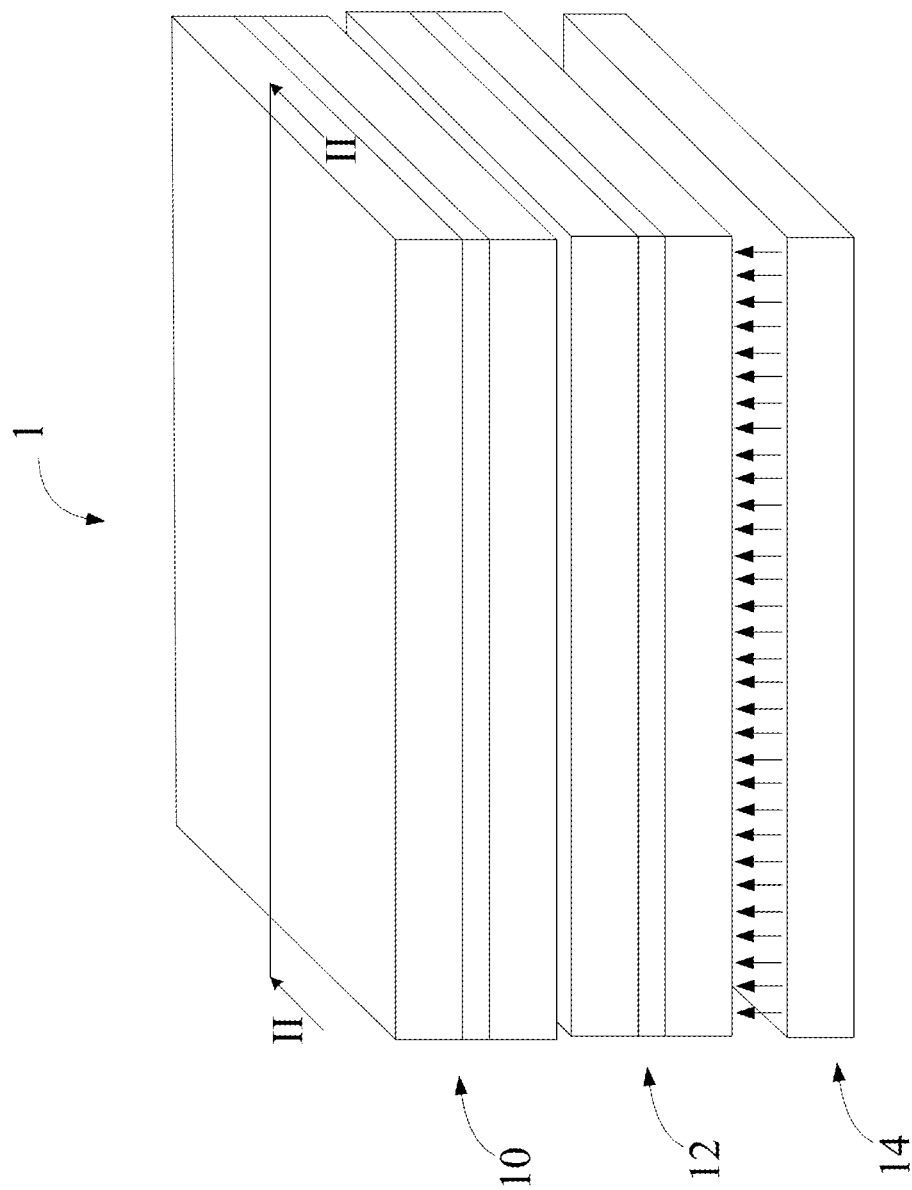
FIG. 1 is a schematic structural view of a display panel in accordance with a first embodiment of the present invention.
Figure 2:
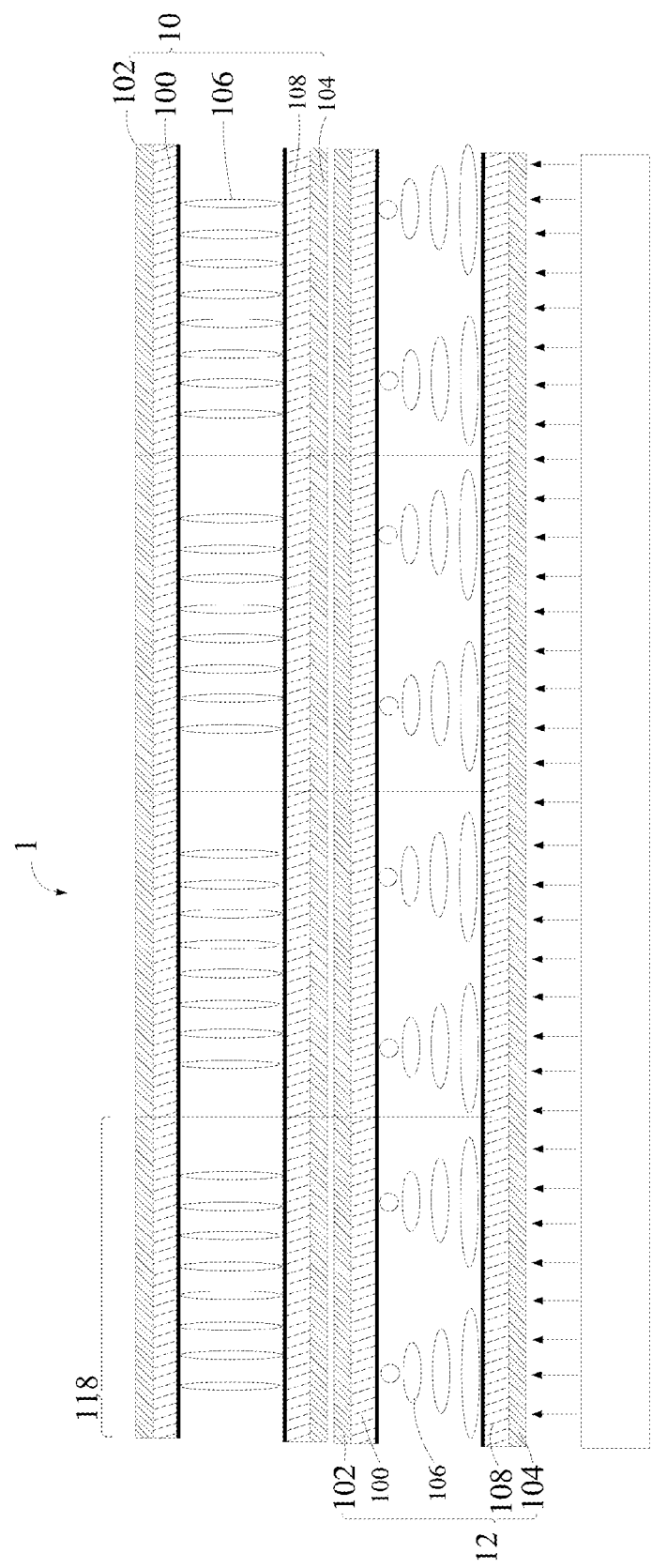
FIG. 2 is a cross sectional view of the display panel of FIG. 1 taken along II-II line.
Figure 3:
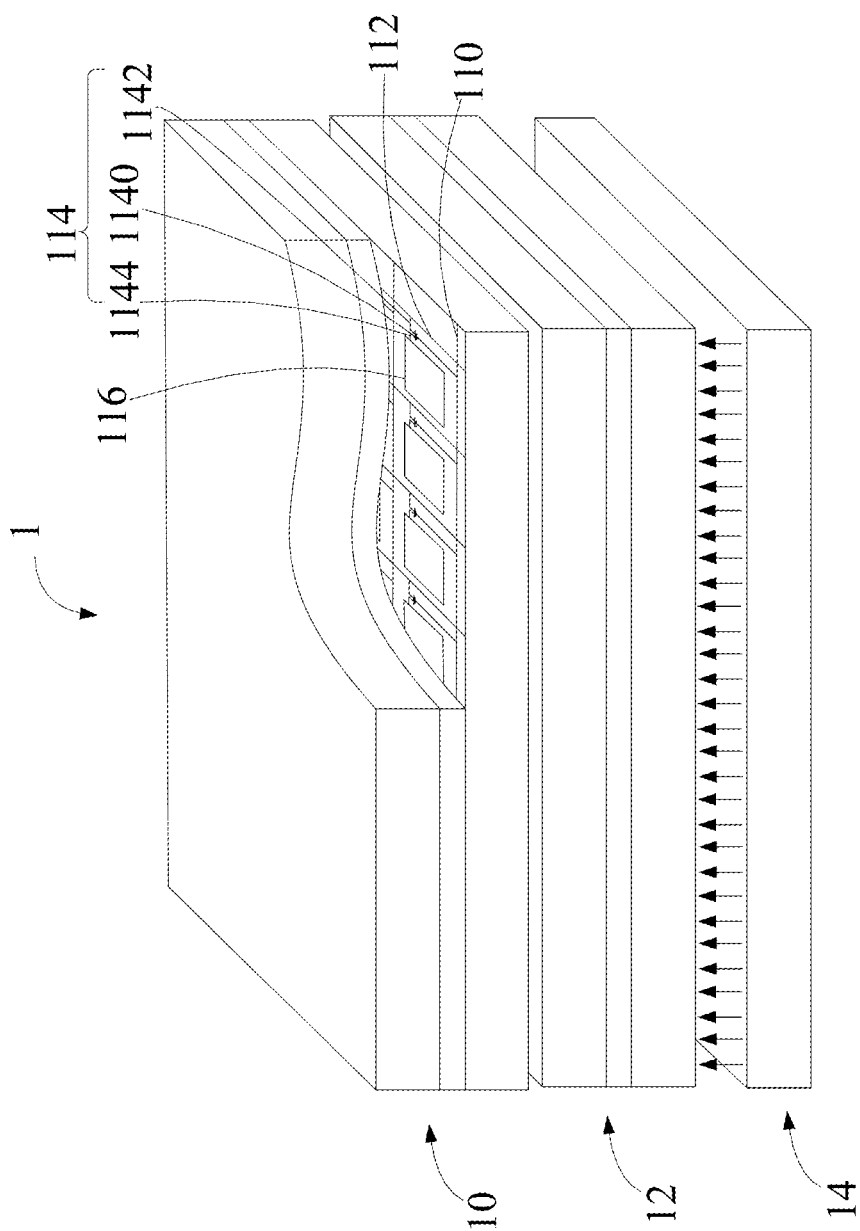
FIG. 3 is a partial cut away view of the display panel of FIG. 1.

Referring to FIGS. 1, 2, and 3, a display panel 1 provided by a first embodiment of the present invention includes a first liquid crystal panel 10, a second liquid crystal panel 12, and a backlight module 14. The first liquid crystal panel 10 and the second liquid crystal panel 12 have the same size, shape, and pixel arrangement. Each pixel of the first liquid crystal panel 10 is aligned with each pixel of the second liquid crystal panel 12. The first liquid crystal panel 10 is a normal white liquid crystal panel. The second liquid crystal panel 12 is a normal black liquid crystal panel. Light emitted from the backlight module 14 pass through the first liquid crystal panel 10 and the second liquid crystal panel 12 in order and is modulated to display an image.

Each of the first liquid crystal panel 10 and the second liquid crystal panel 12 includes a same structure which includes a color filter substrate 100, an upper polarizer 102, a lower polarizer 104, a number of liquid crystal molecules 106, and a thin film transistor substrate 108. The upper polarizer 102 is set on the color filter substrate 100. The lower polarizer 104 is set on the thin film transistor substrate 108. The liquid crystal molecules are disposed between the color filter substrate 100 and the thin film transistor substrate 108.

The thin film transistor substrate 108 includes a number of scan lines 110 extending along a first direction, a number of data lines 112 extending from a second direction, a number of thin film transistors 114, and a number of pixel electrodes 116. The scan lines 110 cross with the data lines 112 to define a number of pixel units 118 arranged as a matrix. The thin film transistors 114 are correspondingly set at cross points of the scan lines 110 and the data lines 112 in each pixel unit 118. Each of the thin film transistors 114 includes a gate electrode 1140, a source electrode 1142, and a drain electrode 1144. The gate electrode 1140 is connected to the scan lines 110. The source electrode 1142 is connected to the data line 112. The drain electrode 1144 is connected to the pixel electrode 116 in the pixel unit 118. When the thin film transistor 114 is selected via the gate electrode 1140 connected to the scan lines 110, the source electrode 1142 of the thin film transistor 114 is conducted with the drain electrode 1144. Display signal from the data lines 112 is transmitted to pixel electrode 116 via the source electrode 1142 and the drain electrode 1144 to drive the liquid crystal molecules 106.

A polarization direction of the upper polarizer 102 of the first liquid crystal panel 10 is perpendicular to a polarization direction of the lower polarizer 104. When the pixel electrode 116 do not apply a voltage to the liquid crystal molecules 106, a polarization direction of the backlight come out from the lower polarizer 104 is rotated 90 degree after passing through twisted liquid crystal molecules 106 and emitted out from the upper polarizer 102 to make the first liquid crystal panel displays a white image without a voltage applied. When the pixel electrode 116 applies the voltage to the liquid crystal molecules 106, the liquid crystal molecules 106 are tidily arranged along a direction of the electric filed and do not change the polarization direction of the backlight to make the backlight come out from the lower polarizer 104 cannot pass through the upper polarizer 102 due to the polarization of the backlight is perpendicular to the polarization direction of the upper polarizer 102. Meanwhile, the first liquid crystal panel 10 displays a black image.

A polarization direction of the upper polarizer 102 of the second liquid crystal panel 12 is parallel to a polarization direction of the lower polarizer 104. When the pixel electrode 116 do not apply a voltage to the liquid crystal molecules 106, a polarization direction of the backlight come out from the lower polarizer 104 is rotated 90 degree after passing through twisted liquid crystal molecules 106 and is exactly perpendicular to the polarization direction of the upper polarizer 102, thus the backlight cannot come out and the first liquid crystal panel 10 display a black image without a voltage applied on. When the pixel electrode 116 applies the voltage to the liquid crystal molecules 106, the liquid crystal molecules 106 are tidily arranged along a direction of the electric filed and do not change the polarization direction of the backlight to make the polarization direction of the backlight passing through the lower polarizer 104 is parallel to the polarization direction of the upper polarizer 102, and thus the backlight can come out. Meanwhile, the second liquid crystal panel 12 displays a white image.

Because the first liquid crystal panel 10 is a normal white liquid crystal panel, a response time from the black image to the white image is longer than a response time from the white image to the black image. The second liquid crystal panel 12 is a normal black liquid crystal panel, and thus a response time from the white image to the black image is longer than a response time from the black image to the white image. When the first liquid crystal panel 10 is stacked with the second liquid crystal panel 12, the response time from the black image to the white image is provided by the first liquid crystal panel 10, the response time from the white image to the black image is provided by the second liquid crystal panel 12. Therefore, the display panel of the embodiment of the present invention has a shorter response time comparing with the single normal black liquid crystal panel or the single normal white liquid crystal panel.

Figure 4:
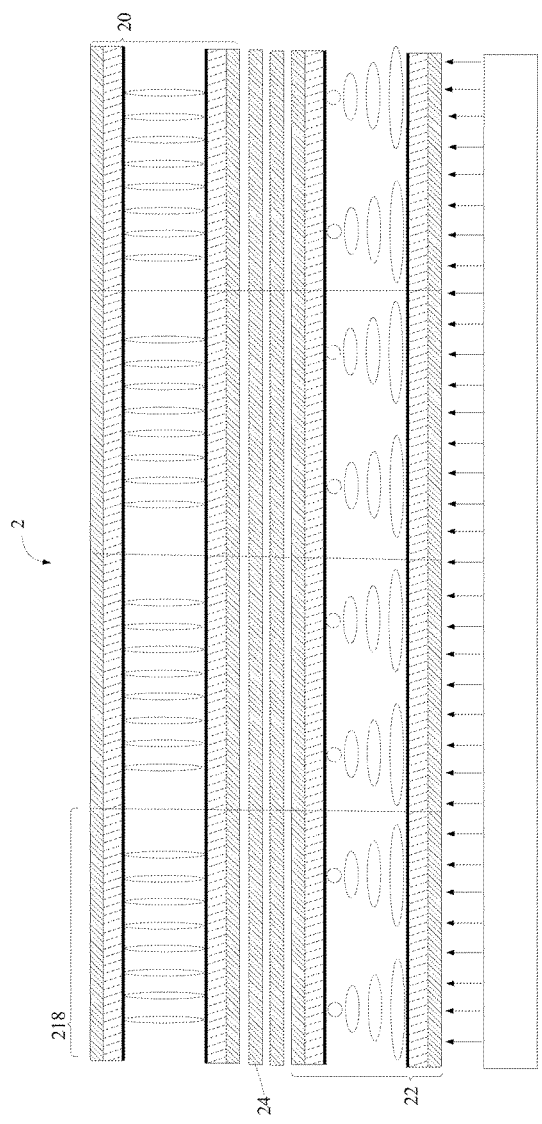
FIG. 4 is a schematic structural view of a display panel in accordance with a second embodiment of the present invention.

Referring to FIG. 4, a display panel 2 provided by a second embodiment of the present invention has a structure similar to the display panel 1 of the first embodiment, a difference between them is that the display panel 2 further includes an anisotropy phase compensating film 24 set between the first liquid crystal panel 20 and the second liquid crystal panel 22. The anisotropy phase compensating film 24 is selected from a group consisting of a parallel optical axis phase compensating film (A-Plate film) and a perpendicular optical axis phase compensating film (C-Plate film). An optical axis of the parallel optical axis phase compensating film is parallel to a surface of the film. An optical axis of the perpendicular optical axis phase compensating film is perpendicular to the surface of the film.

Because there is a gap between the first liquid crystal panel 20 and the second liquid crystal panel 22, a light passes through the lower first or second liquid crystal display panel 20 and 22 may emits out from an adjacent pixel unit of the upper first or second liquid crystal panel 20 and 22 not exactly facing when the display panel 2 is seen from an angle a little far from the central, which influence the display effect of the display panel 2 in a wide viewing angle. A Conoscopy phenomenon showing spatial light and dark distribution of a light in the displaying light path due to different phase delays is generated when the anisotropy phase compensating film 24 is added between the first liquid crystal panel 20 and the second liquid crystal panel 22. Making use of this phenomenon, the adjacent pixel unit 218 not exactly facing is located at a dark region by regulating a thickness of the anisotropy phase compensating film 24 according to a size of the pixel unit 218 to avoid the light emits out from the adjacent pixel unit 218 not exactly facing and the wide viewing angle performance of the display panel 2 is improved.

The display panel 1 of the embodiment of the present embodiment makes a dual-layers panel structure by stacking the normal white liquid crystal panel and the normal black liquid crystal panel, employs the normal black liquid crystal panel to provide the shorter response time from the black image to the white image, employs the normal white liquid crystal panel to provide the shorter response time from the white image to the black image, and thus shorten the response time of the whole display panel. Meanwhile, the wide viewing angle display performance is improved by adding the anisotropy phase compensating film 24 to restrict the light from the angle deviated a little wide emits out from the pixel unit not exactly facing.

What is said above are only preferred examples of present invention, not intended to limit the present invention, any modifications, equivalent substitutions and improvements etc. made within the spirit and principle of the present invention, should be included in the protection range of the present invention.

What is claimed is:

1. A display panel, comprising:
    a first liquid crystal panel;
    a second liquid crystal panel stacked on the first liquid crystal panel; and
    a backlight module set below the first liquid crystal panel and the second liquid crystal panel;
wherein the first liquid crystal panel and the second liquid crystal panel are similar as shape and size and have a same pixel arrangement, each pixel on the first liquid crystal panel is aligned with a corresponding pixel on the second liquid crystal panel, the first liquid crystal panel is a normal white liquid crystal panel, the second liquid crystal is a normal black liquid crystal panel, a light from the backlight module orderly passes through the first liquid crystal panel and the second liquid crystal panel and is modulated to display an image.

2. The display panel of claim 1, wherein each of the first liquid crystal panel and the second liquid crystal panel includes a color filter substrate, an upper polarizer, a lower polarizer, a plurality of liquid crystal molecules, and a thin film transistor substrate, and the liquid crystal molecules are set between the color filter and the thin film transistor substrate.

3. The display panel of claim 2, wherein a polarization direction of the upper polarizer of the first liquid crystal panel is perpendicular to a polarization of the lower polarizer.

4. The display panel of claim 2, wherein a polarization direction of the upper polarizer of the second liquid crystal panel is parallel to a polarization of the lower polarizer.

5. The display panel of claim 2, wherein a polarization direction of the upper polarizer of the second liquid crystal panel is perpendicular to a polarization of the lower polarizer.

6. The display panel of claim 2, wherein the thin film transistor substrate comprises a plurality of scan lines extending along a first direction, a plurality of data lines extending from a second direction, a plurality of thin film transistors, and a plurality of pixel electrodes.

7. The display panel of claim 6, wherein the thin film transistors are correspondingly set at cross points of the scan lines and the data lines in each pixel unit, each of the thin film transistors comprises a gate electrode, a source electrode, and a drain electrode, the gate electrode is connected to the scan lines, the source electrode is connected to the data line, the drain electrode is connected to the pixel electrode in the pixel unit.

8. The display panel of claim 1, further comprising an anisotropy phase compensating film set between the first liquid crystal panel and the second liquid crystal panel.

9. The display panel of claim 8, wherein the anisotropy phase compensating film is selected from a group consisting of a parallel optical axis phase compensating film and a perpendicular optical axis phase compensating film.

10. The display panel of claim 9, wherein optical axes of the parallel optical axis phase compensating film is parallel to a surface of the film, and optical axis of the perpendicular optical axis phase compensating film is perpendicular to the surface of the film.

* * * * *